(12) United States Patent
Smith

(10) Patent No.: US 6,754,499 B1
(45) Date of Patent: Jun. 22, 2004

(54) TELECOMMUNICATIONS NETWORKS

(75) Inventor: David Smith, Guildford (GB)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 588 days.

(21) Appl. No.: 09/713,324

(22) Filed: Nov. 16, 2000

(30) Foreign Application Priority Data

Nov. 17, 1999 (GB) ............................................. 9927219

(51) Int. Cl.[7] .............................................. H04Q 7/20
(52) U.S. Cl. ...................... 455/450; 455/509; 455/446; 455/447; 455/512; 370/328; 370/337; 370/347
(58) Field of Search ................................ 455/446–447, 455/450, 452.1, 452.2, 453, 455, 464, 509, 512, 515; 370/328, 329, 330, 331, 332, 333, 337, 340, 341, 347, 348, 431, 442

(56) References Cited

U.S. PATENT DOCUMENTS

| | | | | |
|---|---|---|---|---|
| 4,928,273 A | | 5/1990 | Protopapas | |
| 5,307,507 A | * | 4/1994 | Kanai | 455/447 |
| 5,515,379 A | * | 5/1996 | Crisler et al. | 370/347 |
| 5,530,917 A | * | 6/1996 | Andersson et al. | 455/436 |
| 5,598,417 A | * | 1/1997 | Crisler et al. | 370/348 |
| 5,666,655 A | * | 9/1997 | Ishikawa et al. | 455/512 |
| 5,710,762 A | * | 1/1998 | Petranovich | 370/280 |
| 5,809,015 A | * | 9/1998 | Elliott et al. | 370/280 |
| 5,937,002 A | | 8/1999 | Andersson et al. | |
| 6,014,570 A | * | 1/2000 | Wong et al. | 455/500 |
| 6,400,704 B2 | * | 6/2002 | Mikuni et al. | 370/347 |
| 6,574,211 B2 | * | 6/2003 | Padovani et al. | 370/347 |

FOREIGN PATENT DOCUMENTS

| | | |
|---|---|---|
| EP | 0827294 | 3/1998 |
| GB | 2318252 | 4/1998 |
| WO | WO98/52377 | 11/1998 |

* cited by examiner

*Primary Examiner*—Erika Gary
*Assistant Examiner*—Kamran Afshar

(57) ABSTRACT

A method of channel allocation in a Time Division Multiple Access (TDMA) telecommunications system in which timeslots are allocated to channels such that allocated timeslots form a group which is contiguous in the time domain, thereby reducing the number of bursts which overlap and thus mutually interfere.

7 Claims, 4 Drawing Sheets

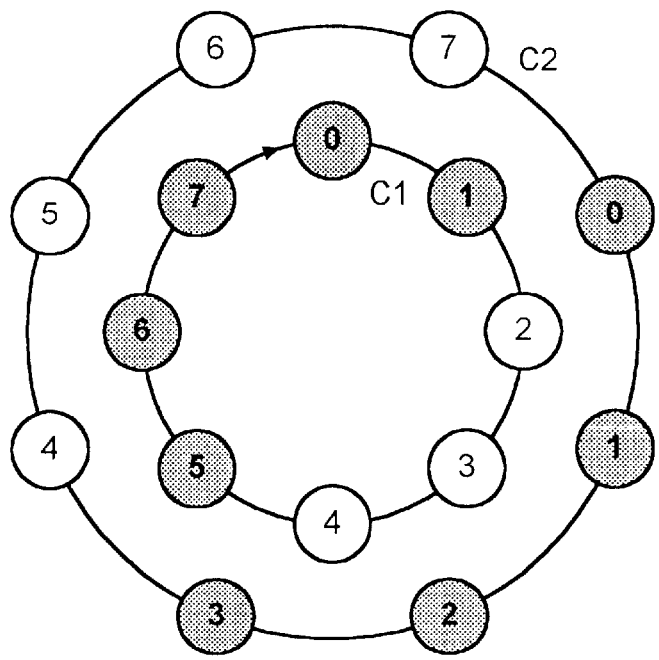
FIG. 10
| TN | 0 | 1 | 2 | 3 | 4 | 5 | 6 | 7 |
|---|---|---|---|---|---|---|---|---|
|  |  | 1 |  | 3 | 4 |  |  | 1 |
FIG. 11
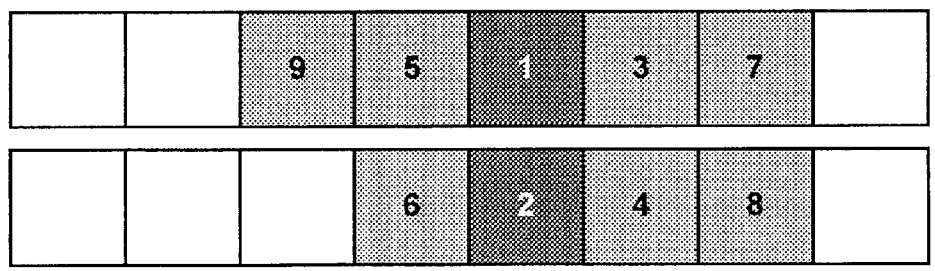
FIG. 12

TELECOMMUNICATIONS NETWORKS

This application claims priority under 35 U.S.C. §§ 119 and/or 365 to 9927219.7 filed in Great Britain on Nov. 17, 1999; the entire content of which is hereby incorporated by reference.

FIELD OF THE INVENTION

The present invention relates to telecommunications networks and in particular to cellular mobile telecommunications networks.

BACKGROUND OF THE INVENTION

FIG. 1 of the accompanying drawings illustrates a cellular mobile telecommunications network which defines a number of cells C1 . . . C8, each of which has a basestation BS1 . . . BS8. Mobile stations MS1 . . . MS3 are able to roam through the cells. In the simplest case, a mobile station will communicate with the basestation of the cell in which it is located. When more than one mobile station wishes to communicate with a basestation, the telecommunications system must allocate available radio frequency spectrum to the various mobile stations.

The amount of radio frequency spectrum is a finite resource and many cellular operators do not have as large an allocation as they would wish. There are two basic approaches for allocating channels to mobile stations to give high capacity. One approach is to use a high number of small cells, and the other is to provide a lower number of higher capacity cells. The former approach tends to be more costly to implement than the latter because of the fixed costs associated with the provision of a large number of cells.

The present very high (and still increasing) penetration of mobile phone usage therefore makes increasing the efficient use of radio frequency spectrum a critical and commercial factor for both cellular radio system manufacturers and operators. Higher spectral efficiency allows denser frequency reuse patterns, and thus allows a frequency limited operator to deploy larger (and thus fewer) cells.

To some extent, all radio channels in a cellular system interfere with each other, both in the frequency and time domains. It is therefore desirable to attempt to allocate channels such that interference between channels is at least predictable.

This can be realised by trying to allocate radio channels which have relatively low levels of interference from existing connection allocations and conversely which will not present unacceptable levels of interference to such existing connections that were allocated based on an interference situation predating the current allocation.

An efficient allocation scheme is one where the carrier/interference ratio is approximately equal for the radio links towards all active mobile stations, said carrier to interference ratio being as small as practicable compatible with the demand that the signal shall be carried with acceptable fidelity. Since different mobiles are located in different physical places that have correspondingly different propagation characteristics, these radio links typically have corresponding different values for signal strength.

The problem of channel allocation is to find an algorithm that gives this mapping of connections onto spectrum such that all parts of the available spectrum have as equal as possible carrier to interference ratio. Specifically this means that no part of the available spectrum shall be (globally) unused while other parts carry multiple connections that mutually interfere: rather the used channels shall be spread out as evenly as possible in the time/frequency space, in which the mean variance of carrier/interference (C/I) ratios are minimised.

A well known and understood multiple access scheme is the Time Division Multiple Access (TDMA) scheme in which mobile station channels are distributed in time. A brief description of a known TDMA system is given below, and more detailed information can be found, for example, in "The GSM system for mobile communications" by Mouly & Pautet, ISBN 2-9507190-0-7.

In this description, channel allocation is described in the context of a TDMA cellular system constructed according to the GSM recommendations, since this constitutes the most widely used cellular standard at this time. However one skilled in the art will readily appreciate that the principles described can equally be applied to cellular systems built to other TDMA standards.

In the TDMA system defined in the GSM recommendations, signals are transmitted in a sequence of frames, each of which comprises 8 timeslots. A frame is illustrated in FIG. 2. The timeslots are conventionally numbered 0 to 7. Each timeslot is a window in time that may be used to carry a burst of radio energy as a layer 1 carrier for one basic physical channel (BPC).

It is possible (and in fact is normally the case) that a cell will have several transceivers and thus can support several frames concurrently. Two frames are illustrated in FIG. 3. In a GSM system, concurrent frames within one cell must be synchronised with one another. However, it is normally the case that frames in different cells are not synchronised.

When a new connection is established in a cellular radio system (and in certain other circumstances) the system must select a channel (BPC) from those which are currently available. This function is called "channel allocation".

In an efficient system, the channel allocation method may be complex, since the objective is that connections will always have undisturbed radio links, and each radio link allocated presents interference towards other channels in other cells. The method may consider many factors in its attempt to solve for a mapping of all currently used radio links on the available spectrum that gives the best overall interference level on each individual channel.

Typically there are many candidate channels available from which one must be selected to be allocated to the requested new connection.

Many strategies are used and/or have been proposed and are known to those skilled in the art. Some deterministically select channels based on the characteristics of the mobile station involved, e.g. its propagation conditions, distance from the base station, if it is moving etc. These mechanisms typically reduce the number of "favoured" candidates, but typically still do not always result in just one remaining candidate channel.

Typically there are many candidate channels available from which one must be selected to be allocated to the new connection in question.

Current systems monitor candidate (ie currently idle) channels to determine the instantaneous amount of interference present on each, and thereby select the channel with the least interference for allocation.

This "idle channel measurement based allocation" scheme has several deficiencies. Each channel in a given cell potentially suffers interference from channels in surrounding cells which use the same frequencies at the same time.

These mutually interfering connections are established, handed over and terminated independently. The result is that over period of minutes (the duration of a typical call made with a mobile phone), the interference levels on each channel will repeatedly change as new calls are set up and old calls end.

If power control is in use, there will be further variations in the interference levels found on the different channels.

The result is that a channel which appears to be the least disturbed at the instant when it is selected and allocated typically will not remain the least disturbed channel in the cell until the end of the connection.

During busy periods in the capacity scenario, the interference distribution across the candidate channels will change almost continuously, that is to say, will be unstable. Channels allocated based on the instantaneous quality at allocation time will not maintain any systematic advantage over the mean channel quality over any useful time period.

In non-synchronous TDMA networks, it is statistically improbable that one timeslot in one cell interferes neatly with only one timeslot in surrounding cells. This is due primarily to the different cells involved not being synchronised, but can be further complicated by propagation delays in some scenarios, as is well understood.

This means that one channel allocated in one cell typically interferes partly with more than one channel in the interfering cell. Such a scenario is illustrated in FIG. 4, in which a channel 2 of a first cell overlaps the boundary of two channels 4 and 6 of a second cell. This overlap is illustrated by the shadow 3 of the channel 2.

The same effect occurs with each active channel within a cell, resulting in the situation that a minority of channels active in each individual cell may (statistically) result in a majority of channels in surrounding cells being at least partly disturbed. For example, four active channels allocated in one cell can result in all bursts in the second cell being disturbed.

FIG. 5 illustrates a scenario in which 4 allocated timeslots 8 alternate with 4 idle timeslots 10 in the first cell. The second cell also includes alternating allocated 12 and idle 14 timeslots. If the cells were synchronised it is possible that there would be no overlap, however in the typical case shown in FIG. 5, there will be overlap and in this case all allocated timeslots find themselves partly overlapped (shown as a shadow 9 in FIG. 5).

It is therefore desirable to allocate channels in such a way that interference can be reduced.

SUMMARY OF THE PRESENT INVENTION

According to one aspect of the present invention, there is provided a method of allocating timeslots in a Time Division Multiple Access (TDMA) telecommunications system comprising steps of:

defining a first timeslot for allocation to a first channel;
allocating the first timeslot to the first channel to produce a first allocated timeslot;
allocating a second timeslot to a second channel to produce a second allocated timeslot, such that the second allocated time slot is adjacent in time to the first allocated timeslot;
allocating subsequent channels to respective further timeslots, to produce further allocated timeslots, such that each further allocated timeslot is adjacent in time to a previously allocated timeslot, thereby forming a contiguous group in the time domain.

According to another aspect of the present invention, there is provided a method of channel allocation in a Time Division Multiple Access (TDMA) telecommunications system in which timeslots are allocated to channels such that allocated timeslots form a group which is contiguous in the time domain.

According to another aspect of the present invention, there is provided a method of allocating channels in a TDMA cellular radio system, such that the channels allocated in any one cell are clustered in the time domain which is stable over the long term and further that this centre of the cluster is configured such that it advantageously falls in a region of the time domain that over the long term has below average interference resulting in a mean improvement in the interference level experienced.

BRIEF DESCRIPTION OF THE DRAWINGS

FIGS. 9 and 10 are alternative illustrations of channel allocation according to the present invention; and FIG. 11 illustrates channel allocation according to the present invention in a frequency hopping system.

FIG. 12 illustrates a channel allocation from two cells in a reuse system.

DESCRIPTION OF THE PREFERRED EMBODIMENTS

Figure 1:
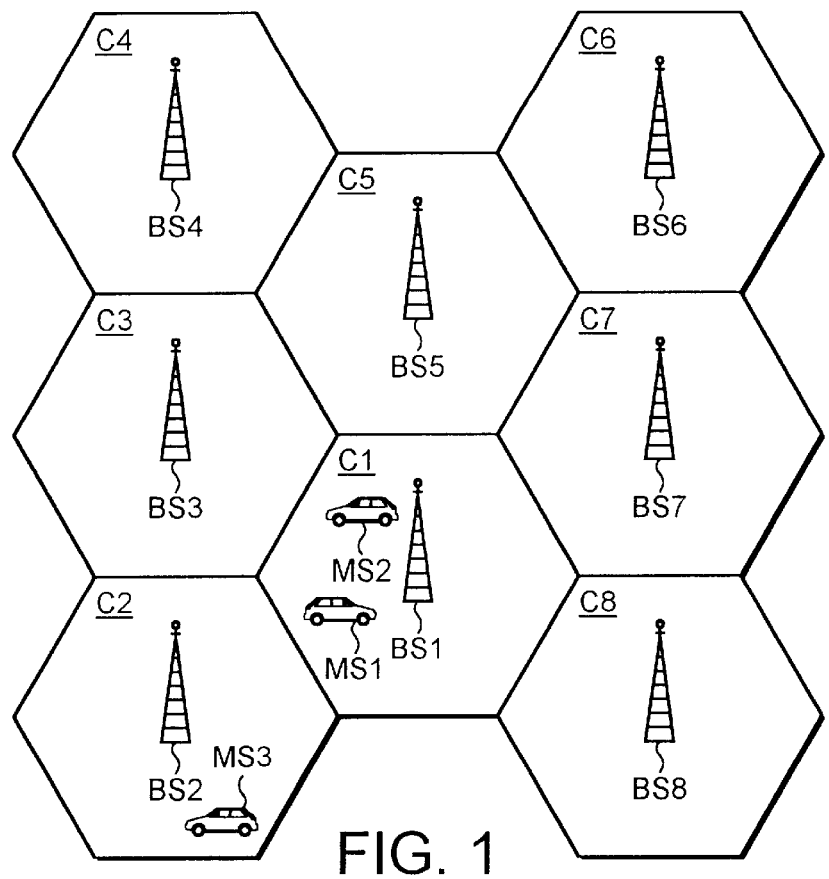
FIG. 1 illustrates a cellular telecommunications network.
Figure 2:
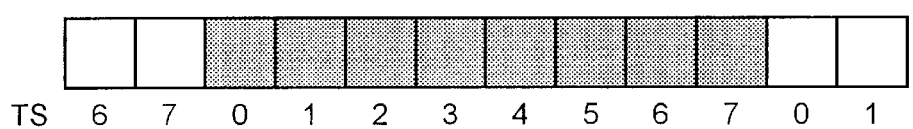
FIG. 2 illustrates a TDMA frame.
Figure 3:
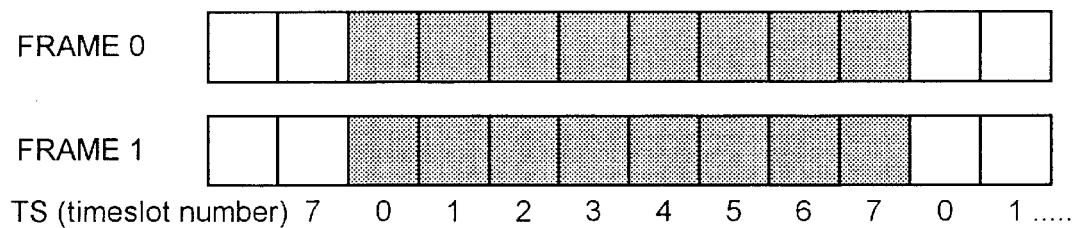
FIG. 3 illustrates a pair of concurrent TDMA frames.
Figure 4:
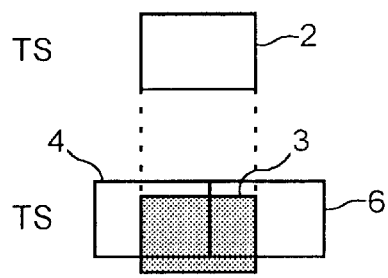
FIGS. 4 and 5 illustrate interference between channels in adjacent cells.
Figure 5:
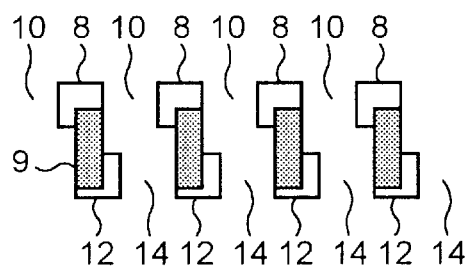
Figure 6:
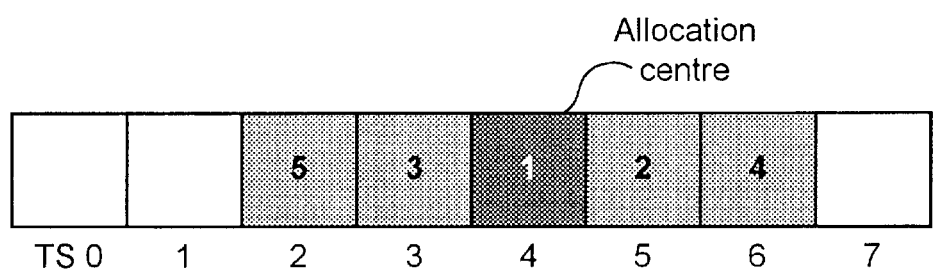
FIGS. 6 and 7 illustrate channel allocation in accordance with one aspect of the present invention.

FIG. 6 illustrates channel allocation in accordance with a method embodying the present invention, in which timeslots are allocated such that the allocated channels form a contiguous grouping in the time domain. The first channel is allocated to a predetermined first timeslot, which is chosen in advance as will be described in more detail below. The subsequent channels are then allocated to timeslots which are adjacent in time to the already allocated timeslots. The allocated timeslots thereby form a contiguous grouping in the time domain. In the example shown in FIG. 6, the allocation is centred on timeslot 4. The channels are then allocated to timeslots in the order: 4,5,3,6,2,7,1,0. Alternatively, the channels could be allocated in the order: 4,3,5,2,6,1,7,0. The allocation is made on the first TS that is reached which is idle at the time. There is no preference between these two variants of the strategy (i.e. parsing right first or left first) in this simplest example.

It is possible, although less desirable, to extend the allocation in any one cell in just one direction. However, since the "allocation centre" described above is placed as close as possible to the point in the time domain furthest from the most interfered bursts, extending in just one direction would more rapidly reach said heavily disturbed bursts. If it were desired to extend allocation in only one direction, it is possible to start the allocation from close to the opposite edge of the less disturbed region of the time domain. It can therefore be seen that it is important that the allocation strategy and strategy for selecting the starting point for the allocation should ideally be synergistic.

One of the problems of allocating channels is that it is not deterministically known which cell will have higher than typical load at any given instant, since the instantaneous offered traffic in each cell is statistical in nature. If cells are statically assigned subsets of the time domain (that is each cell has a window of undisturbed bursts which it may use), then if at a given instant said cell is offered above average traffic beyond the available number of channels within said window, said extra traffic will either have to be rejected due to congestion, or carried at the risk of overlapping with and thus disturbing channels carried in other areas of the time domain nominally statically assigned to other cells. This problem is reduced if "allocation centres" are assigned, from which allocation works outwards, rather than defined windows which may be "filled in", since the risk that one cell may instantaneously exhibit higher than average traffic is partly offset by a statistical chance that the adjacent channel will be loaded less densely than normal, that is to say a "trunking" efficiency in the use of the time domain. Allocating outwards equally either side from a midpoint minimises the mean distance of bursts from said midpoint, and thus minimises the likelihood of overlaps resulting from extreme traffic levels in certain random cells at certain instants due to the statistical nature of the offered traffic.

Figure 7:
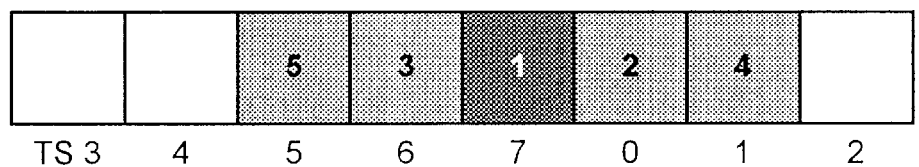

The allocation centre can be arranged to occur anywhere in the frame, and the allocated timeslots can "roll over" to the next or previous frame. Such an arrangement is shown in FIG. 7, in which the allocation of timeslots is centred about timeslot 7 in a frame.

Figure 8:
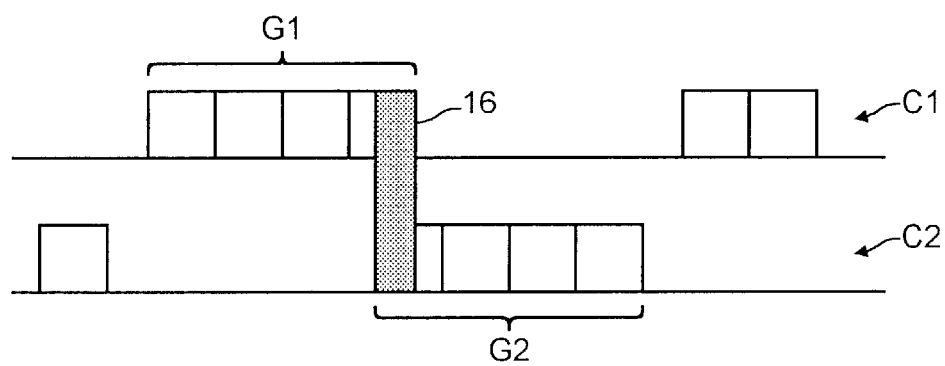
FIG. 8 illustrates interference between cells in an allocation method according to one aspect of the present invention.

By grouping the allocation of timeslots for channels in the time domain in this way, the number of boundaries between idle and busy channels in a single frame is reduced. FIG. 8 shows a scenario in which channels in adjacent cells are grouped as described. Cells C1 and C2 have respective groups G1 and G2, followed by respective idle periods.

Assuming that the cells are not synchronised with one another (as is usually the case), then with the channel grouping described only one boundary will encounter any interference. This area is illustrated by the grey area 16 in FIG. 8. By managing the allocation of channels in the time domain the amount of interference can be reduced, since the member of channels experiencing any overlap is reduced.

Those skilled in the art will appreciate that such a reduction in the mean interference level between cells allows the reuse pattern to be tightened, giving higher spectral efficiency and thus capacity for a given number of sites and licensed band in the network.

The initial allocation timeslot is preferably chosen to be at a stable position in the frame over time. This point can be found by monitoring interference levels on each timeslot over the long term.

Figure 9:
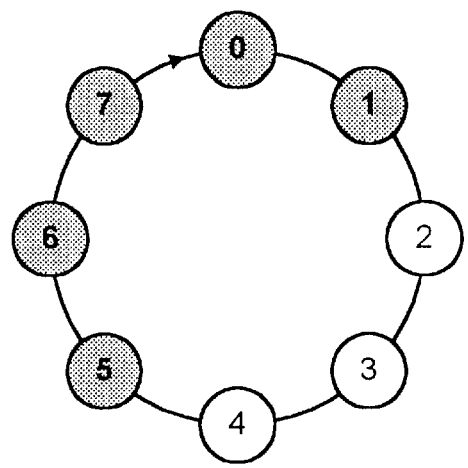

By setting the initial allocation point to be stable over the long term means that each cell can identify its own optimal start point for channel allocation. Referring to FIG. 9, the time frame can be represented as a ring of timeslots to demonstrate the "rollover" effect shown in FIG. 7. Such a circular illustration of the time frame also conveniently demonstrates the allocation of start point for adjacent cells.

Referring to FIG. 10, using long term interference measurements, a first cell C1 chooses its initial allocation point to be timeslot 7. Cell C2, also using long term measurements, can choose its initial point to be timeslot 1 so as to avoid the timeslots allocated by cell C1.

Thus, the second cell allocates its channels in the undisturbed area of the time domain, so that the majority of the bursts do not interfere at all.

The "allocation centre" is arranged to be in the "hole" in the interference presented by the first cell, and consequently the first cell finds itself correspondingly in the "hole" left by the second. The net result is that the mean interference between channels in the two cells is substantially reduced compared to current channel allocation strategies.

Note that since the allocation centres are placed to fall in the centre of the gap in the interference from potentially interfering cells, and since the cells are not synchronised, the timeslot number that is used as the allocation centre in each cell is quite arbitrary.

In a non-ideal, real world situation, the provision of active timeslots is not static, since new connections are constantly being allocated idle channels, and existing connections are terminated. This means that the clean contiguous channel allocation will not always exist. A contiguous group of channels may be allocated initially, but then one of the channels in the middle of the group will terminate leaving a small "hole". In such a case, the channel allocation method will fill such "holes" in the contiguous group in preference to adding on to the edge of the group. Thus, even imperfect grouping of channels will still outperform conventional allocations which are not deterministically clustered at all.

Correspondingly, the number of allocated timeslots in each cell will vary dynamically. During some periods (off peak) the contiguous group in both cells will shrink and the result will be that there is no overlap at all. Conversely during busy times, more than half of the timeslots in each cell may be allocated, and in this case there will still be significant overlap. However, since the allocation centre for a cell will tend to be opposite to that of an interfering cell, the amount of overlap is always reduced or minimised.

It is possible to configure the timeslot number that will serve as the "allocation centre" manually.

However a preferred embodiment includes automatic adaptive configuration of the allocation centre in a manner that increases the chances of a reduced mean level of interference in the network.

As above, the objective is to find the part of the time domain that has the least interference. This can be done by monitoring the interference, when the channels are idle, using conventional monitoring techniques.

However there are several fundamental differences in the way interference data are used in a method according to the invention.

In the present invention long term average interference levels are used to determine a stable long term position for the initial allocation point. "Long term" average means over a period of time which is much greater than the mean call holding time. Once an initial allocation point has been identified, it is kept stable over the long term, even if instantaneous interference values are quite different from the long term average value.

In current systems, the objective is to identify which individual channel is "best" now. Instead, in the present invention an area comprising several contiguous time slots of the time domain that has a better long term average is identified; it is possible that an individual timeslot close to the selected initial allocation point can be quite badly disturbed, provided that the majority of the surrounding timeslots are substantially less disturbed than normal.

In today's system each channel is considered independently. Instead the present invention aggregates the interference recorded on multiple channels, in particular on all channels on the same timeslot.

The following example methodology aims to set out the principles of channel allocation according to the present invention. It will be readily appreciated that variations to this example are encompassed by the scope of the present invention.

Consider a set of channels with ICM (idle channel measurement, a well known technique) "scores" that reflect the mean interference level recorded on those channels over a measurement period sufficiently extended to be statistically meaningful. (This will typically be over hundreds of calls, several hours, or even longer.)

Each timeslot in turn is considered as a candidate for the "allocation centre". The method is intended to evaluate the interference in the area surrounding that candidate centre.

The "area surrounding" may be defined in various ways. In a small system where there are large instantaneous variations in the offered traffic about the mean offered traffic level, a simple algorithm that computes a weighted function of the interference on each or all timeslots may be used.

In other cases only some of the timeslots should be considered. For example, in a large cell there may be have good statistical confidence limits on the level of offered traffic, and thus there is statistically a smaller variance about the mean number of allocated timeslots on each frame, it would then be possible to consider only a "group" of that width, centred on the candidate allocation centre, rather than the full frame.

A preferred embodiment of the above is that the mean ICM score of each timeslot is weighted by the statistical expectation of its mean utilisation. An advanced variant of this methodology might even take account of the expectation that this mean utilisation will vary over the course of the day in response to the traffic model, or a measured (but long term) analysis of the running system.

A simple exemplary algorithm that works in this manner as a preferred embodiment of the invention will now be described. Assume that, on average, only 5 timeslots of the available 8 are needed to be allocated.

The method computes an "overall score" for each candidate centre by adding a weighted score for each timeslot in a contiguous group of 5 timeslots centred about the candidate. To aid clarity, in this example the weighting will be made in simple manner, increasing the weight given to interference the further away from the candidate centre each timeslot is.

In this example it will be assumed that a lower ICM score represents a better channel—ie less interference. Distance is counted as x1 if interference in on the candidate centre, x2 if on an adjacent timeslot, x3 on an adjacent but one, etc . . . The distance is determined using the shortest path, allowing wrapping (backwards as well as forward) across the frame boundary. Referring to FIG. 11, the high interference channels are at timeslots 3 and 4, with some lower interference values occurring at time slots 1 and 7. The "scores" for each candidate centre are thus given by:

| Candidate: | score |
|---|---|
| TS0: | $0 \times 1 + 1 \times 2 + 1 \times 2 + 0 \times 3 + 0 \times 3 = 4$ |
| TS1: | $1 \times 1 + 0 \times 2 + 0 \times 2 + 3 \times 3 + 1 \times 3 = 13$ |
| TS2: | $0 \times 1 + 1 \times 2 + 3 \times 2 + 4 \times 3 + 0 \times 3 = 20$ |
| TS3: | $3 \times 1 + 0 \times 2 + 4 \times 2 + 0 \times 3 + 1 \times 3 = 14$ |
| TS4: | $4 \times 1 + 0 \times 2 + 3 \times 2 + 0 \times 3 + 0 \times 3 = 10$ |
| TS5: | $0 \times 1 + 4 \times 2 + 0 \times 2 + 1 \times 3 + 3 \times 3 - 20$ |

-continued

| Candidate: | score |
|---|---|
| TS6: | $0 \times 1 + 1 \times 2 + 0 \times 2 + 0 \times 3 + 4 \times 3 = 14$ |
| TS7: | $1 \times 1 + 0 \times 2 + 0 \times 2 + 1 \times 3 + 0 \times 3 = 4$ |

The lowest scores in this exemplary scenario occur for TS(0) and (7), ie around the frame boundary, because (as might be intuitively expected) this is the area of the time domain furthest from the heavy interference centred on timeslots 3 and 4.

The approach of the present invention can also automatically handle division of the time domain between several cells.

If two cells are in use in a reuse system, they will automatically set their "centers" as close as possible to 4 timeslots out of phase as illustrated in FIG. 12. If three cells are in the reuse system and have similar utilization, they will try to divide the time domain equally into three as best they can. How this works out exactly in any given scenario will depend on the relative synchronization of the cells since this will affect the strength of the interference proportionately to the degree of overlap.

Similarly, if one of the three cells has a higher than average utilisation, its share of the time domain will naturally grow correspondingly as it will produce a wall of interference which is broader, thus compressing the remaining cells into the gap.

In a real world system where cells have many neighbours with differing propagation conditions, the exact result can vary; cells with the strongest interference couplings are automatically given the greatest slice of the time domain.

The allocation centre (initial allocation point) is NOT continuously changed. A specific objective is to stabilise the radio environment. The allocation centre only needs to be repositioned after fundamental change to the system, for example adding a new basestation. Otherwise only periodic (e.g. perhaps nightly, based on ICM scores summed throughout the day) repositioning is sufficient to track slow variations of system characteristics.

Each time one cell resets its allocation centre this will, naturally, have effect on nearby cells. It is thus important that the actual ICM mechanism used to set the centre converges with unconditional stability as all cells in the network asynchronously periodically iterate around the measure and compute a new initial allocation point.

Spectral efficiency and thus capacity for a given channel quality/amount of spectrum needed for a given capacity is thereby advantageously improved.

It will be readily appreciated that a channel allocation method according to the present invention can improve spectral efficiency and thus capacity for a given capacity.

What is claimed is:

1. A method of allocating timeslots in a Time Division Multiple Access (TDMA) telecommunications system comprising steps of:

defining a first timeslot for allocation to a first channel;

allocating the first timeslot to the first channel to produce a first allocated timeslot;

allocating a second timeslot to a second channel to produce a second allocated timeslot such that the second allocated time slot is adjacent in time to the first allocated timeslot;

allocating subsequent channels to respective further timeslots, to produce further allocated timeslots, wherein each subsequently allocated channel is allocated to a vacant timeslot which is closest in time to the first timeslot such that each of the further allocated timeslots is adjacent in time to a previously allocated timeslot, thereby forming a contiguous group of timeslots in the time domain; wherein the first timeslot is adaptively defined based on a weighting function of the distribution of mean interference levels of timeslots across the time domain, wherein the weighting function approximates the mean usage of the timeslots.

2. A method as claimed in claim 1, wherein the contiguous group of timeslots is centered on a timeslot which is stable within a time frame.

3. A method as claimed in 1, wherein when any one of the allocated timeslots become unallocated timeslot, a next channel is allocated to the unallocated timeslot, such that the contiguous group is reformed.

4. Telecommunications apparatus for allocating timeslots in a Time Division Multiple Access (TDMA) telecommunications system, the apparatus comprising:

means for defining a first timeslot for allocation to a first channel;

means for allocating the first timeslot to the first channel to produce a first allocated timeslot;

means for allocating a second timeslot to a second channel to produce a second allocated timeslot, such that the second allocated time slot is adjacent in time to the first allocated timeslot;

a means for allocating subsequent channels to respective further timeslots, to produce further allocated timeslots, wherein each subsequently allocated channel is allocated to a vacant timeslot which is closest in time to the first timeslot and each of the further allocated timeslots is adjacent in time to a previously allocated timeslot, thereby forming a contiguous group in the time domain;

wherein the first timeslot is adaptively defined based on a weighting function of the distribution of mean interference levels of timeslots across the time domain, wherein the weighting function approximates the mean usage of the timeslots; and when any one of the allocated timeslots become an unallocated timeslot, a next channel is allocated to the unallocated timeslot, such that the contiguous group is reformed.

5. A method of allocating timeslots in a Time Division Multiple Access (TDMA) telecommunications system comprising steps of:

in a first cell in the TDMA system:

selecting an initial allocation point for the first cell which defines a first timeslot for allocation to a first channel; allocating the first timeslot to the first channel to produce a first allocated timeslot;

allocating a second timeslot to a second channel to produce a second allocated timeslot, such that the second allocated timeslot is adjacent in time to the first allocated timeslot;

allocating subsequent channels to respective further timeslots, wherein each subsequently allocated channel is allocated to a vacant timeslot which is closest in time to the first timeslot such that each further allocated timeslot is adjacent in time to a previously allocated timeslot, thereby forming a contiguous group in the time domain; and in a second cell in the TDMA system:

selecting an allocation point for the second cell which defines a first timeslot for allocation to a third channel, wherein the allocation point for the second cell is selected to avoid the allocation point for the first cell; allocating the first timeslot to the third channel to produce a first allocated timeslot for the second cell; allocating a second timeslot to a fourth channel to produce a second allocated timeslot for the second cell, such that the second allocated time slot is adjacent in time to the first allocated timeslot; and allocating subsequent channels to respective further timeslots for the second cell, to produce further allocated timeslots, wherein each subsequently allocated channel is allocated to a vacant timeslot which is closest in time to the first timeslot such that each of the further allocated timeslots is adjacent in time to a previously allocated timeslot, thereby forming a contiguous group in the time domain, wherein for both the first cell and the second cell, the first timeslot is adaptively defined based on a weighting function of the distribution of mean interference levels of timeslots across the time domain, wherein the weighting function approximates the mean usage of the timeslots; and when any one of the allocated timeslots become an unallocated timeslot, a next channel is allocated to the unallocated timeslot, such that the contiguous group is reformed.

6. The method of claim 5 further comprising monitoring channel interferences between the first cell and the second cell.

7. The method of claim 6, wherein the selecting an allocation point for the second cell is based on the monitoring of the interferences between the first cell and the second cell such that the allocation point for the second cell is placed in an area of the time domain having the least interference.

* * * * *